United States Patent
Simon

(10) Patent No.: US 11,375,065 B2
(45) Date of Patent: *Jun. 28, 2022

(54) CONTROL INFORMATION FOR PUBLIC SWITCHED TELEPHONE NETWORK (PSTN) USING BLOCKCHAIN SYSTEM

(71) Applicant: Red Hat, Inc., Raleigh, NC (US)

(72) Inventor: Axel Simon, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/095,199

(22) Filed: Nov. 11, 2020

(65) Prior Publication Data

US 2021/0067634 A1 Mar. 4, 2021

Related U.S. Application Data

(63) Continuation of application No. 16/388,756, filed on Apr. 18, 2019, now Pat. No. 10,848,622.

(51) Int. Cl.
*H04M 7/00* (2006.01)
*H04L 9/14* (2006.01)
*G06F 16/182* (2019.01)

(52) U.S. Cl.
CPC ...... *H04M 7/0057* (2013.01); *G06F 16/1824* (2019.01); *H04L 9/14* (2013.01); *H04L 2209/38* (2013.01)

(58) Field of Classification Search
CPC ...... H04M 7/0057; H04L 9/14; H04L 9/0825; G06F 16/1824
See application file for complete search history.

(56) References Cited

U.S. PATENT DOCUMENTS 10,325,079 B1 6/2019 Vukich et al.
10,848,622 B2 * 11/2020 Simon ................. H04M 7/0057
(Continued)

FOREIGN PATENT DOCUMENTS

CN 108200174 A 6/2018

OTHER PUBLICATIONS

Faizann, "Blockchain in the Telecommunication Industry," MessageBird, Aug. 24, 2017, 6 pages. Retrieved on Oct. 26, 2017 from: https://blog.messagebird.com/blockchain-in-the-telecommunication-industry-acb32326452?gi=8cc05dbb9926.
(Continued)

*Primary Examiner* — Mohammad S Anwar
(74) *Attorney, Agent, or Firm* — Womble Bond Dickinson (US) LLP

(57) ABSTRACT

Signaling system for public switched telephone network (PSTN) using a blockchain system. In one embodiment, a method is provided. The method includes determining that a phone call related operation between a first telecommunications operator and a second telecommunications operator was requested. A public switched telephone network (PSTN) comprises the first telecommunications operator and the second telecommunications operator. The method also includes updating, by a node of a blockchain system, a distributed ledger to indicate that the phone call related operation between the first telecommunications operator and the second telecommunications operator was requested. The method further includes analyzing the distributed ledger to determine if the phone call related operation was approved. The method further includes executing the phone call related operation in response to determining that the phone call related operation was approved.

20 Claims, 7 Drawing Sheets

(56) References Cited

U.S. PATENT DOCUMENTS

2017/0017958 A1    1/2017   Scott et al.
2018/0018723 A1    1/2018   Nagla et al.
2018/0048738 A1    2/2018   Hinds
2018/0255130 A1    9/2018   Kozloski et al.
2019/0394023 A1   12/2019   Menon et al.

OTHER PUBLICATIONS

Huang, P., "Making the worid's first blockchain phone call—A new path to decentralization: Function X," Oct. 10, 2018, 5 pages. Retrieved on Oct. 26, 2018 from: https://medium.com/pundix/making-the-worlds-first-blockchain-phone--call-66784b5436ee.

"Reimagining telecommunications with blockchains," IBM, 2018, 22 pages.

"UnitedCorp Announces Filing of Blockchain PSTN-based Patent Application with USPTO," United American Corp, Dec. 27, 2017, 2 pages. Retrieved on Oct. 26, 2018 from: http://www.unitedcorp.com/unitedcorp-announces-filing-of-blockchain-pstn-pased-patent-application-with-uspto/.

\* cited by examiner

CONTROL INFORMATION FOR PUBLIC SWITCHED TELEPHONE NETWORK (PSTN) USING BLOCKCHAIN SYSTEM

RELATED APPLICATION

This application is a continuation of U.S. patent application Ser. No. 16/388,756, filed on Apr. 18, 2019, entitled "CONTROL INFORMATION FOR PUBLIC SWITCHED TELEPHONE NETWORK (PTSN) USING BLOCKCHAIN SYSTEM," the entirety of which is incorporated by reference herein.

TECHNICAL FIELD

Aspects of the present disclosure relate to control information, and more particularly, to control information for a public switched telephone network (PSTN).

BACKGROUND

A publish switched telephone network (PSTN) may be a collection of telephone networks that provide infrastructure and services for telecommunication. The PSTN may include telephone lines (e.g., copper lines or wires), fiber optics lines, other wired networks, cellular networks, satellite networks, and other wireless communications networks. Telecommunication devices, such as telephones, cellular phones, smart phones, etc., may use the PSTN to communicate with each other. For example, a first telecommunication device (e.g., a cellular phone) may establish a phone call with a second telecommunication device (e.g., a telephone) via the PSTN.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
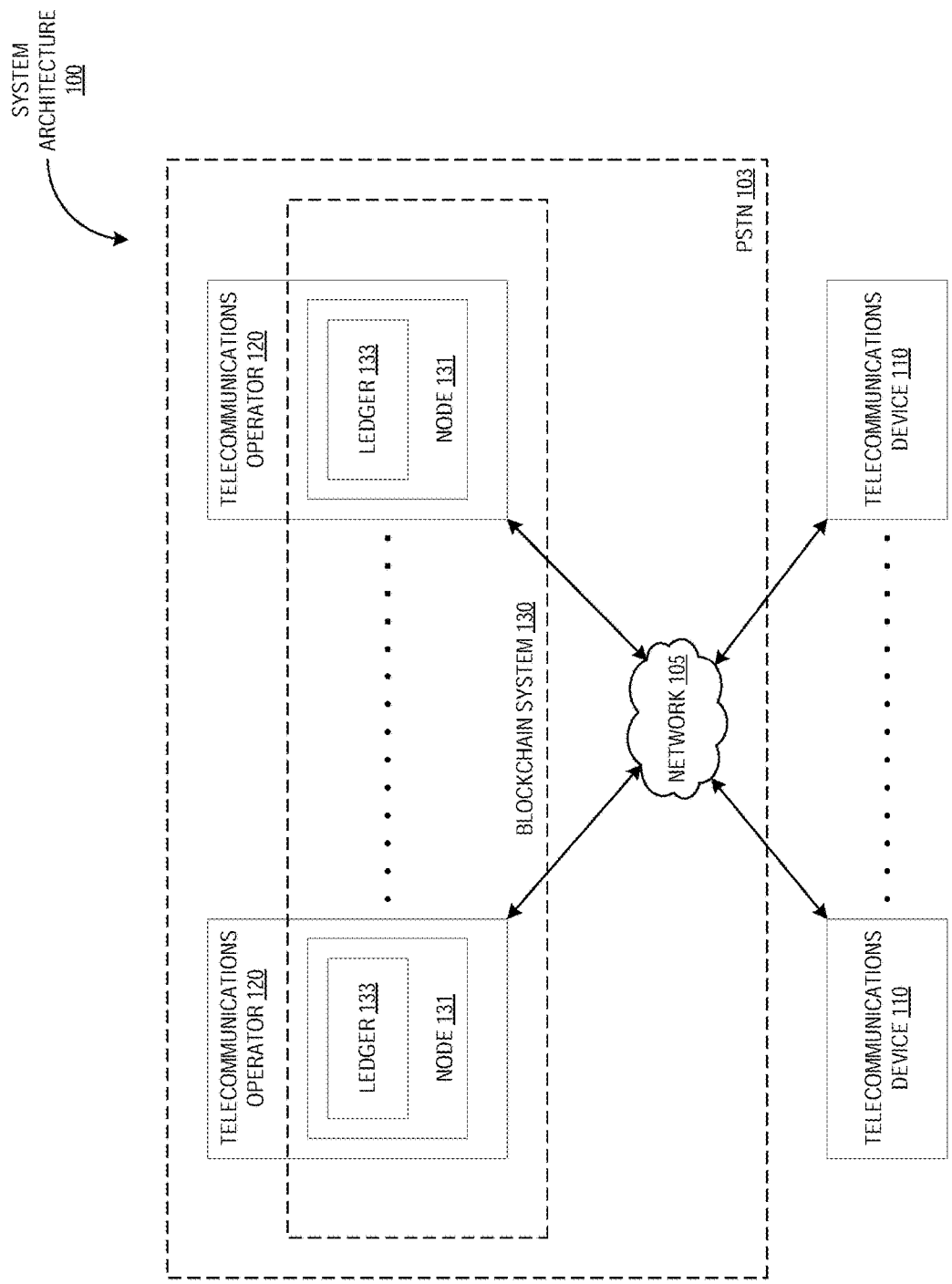
FIG. 1 is a block diagram that illustrates an example system architecture, in accordance with some embodiments of the present disclosure.

As discussed above, A PSTN may be collection of networks that provide infrastructure and services for telecommunication. Telecommunication devices, such as telephones, cellular phones, smart phones, etc., may use the PSTN to communicate with each other. A PSTN may use signaling protocols to exchange control information related to the setup, release, transferring, etc., of phone calls within the PSTN. Generally, a Signaling System No. 7 (SS7) protocol and a SS7 network may be used within a PSTN to exchange such control information. The SS7 protocol may determine what call related operations may be performed (e.g., establishing a call, call waiting, call forwarding, sending/receiving short message service (SMS) messages, multimedia messaging service (MMS) messages, etc.), and the content and format of messages that include the control information. The SS7 network may include a network and computing devices operated by telecommunications operators. The SS7 network may transmit the control information between the computing devices operated by the telecommunications operators. The SS7 network has generally been a secret network. Thus, the SS7 protocol is based on mutual trust between the telecommunications operators. Because of the secrecy of the SS7 network and the mutual trust, access to the SS7 network is generally not authenticated. In addition, the messages transmitted within the SS7 network are generally not encrypted. Furthermore, the SS7 network may not maintain a record of the control information exchanged in the SS7 network. This may allow unauthorized or malicious uses to gain access to the SS7 network and to perform unauthorized actions. For example, a malicious use may be able to forward calls or text messages to a different telecommunications device. In another example, a malicious user may be able to determine the geographic locations of telecommunications devices.

The present disclosure addresses the above-noted and other deficiencies by using a blockchain system to distribute control information used by a PSTN. Thus, the blockchain system may operate as a control information system or network for a PSTN (e.g., similar to the SS7 network). The blockchain system may include a ledger that is distributed across all of the nodes in the blockchain system (e.g., a distributed ledger). The blockchain system may use asymmetric encryption (e.g., public/private key encryption) to write information to and read information from the ledger. Each node of the blockchain system may be owned, operated, managed, controlled, directed by, etc., a telecommunications operator. The distributed ledger may include a record of the control information for a PSTN. The control information may be used to request or perform phone call related operations (e.g., setting up calls, forwarding calls, call waiting, etc.) between telecommunications operators for a PSTN. For example, a request to perform a phone call related operation (e.g., to forward a phone call) and the approval of that request may be stored as entries in the ledger. The blockchain system may protect the control information against loss. The blockchain system may also prevent unauthorized users from accessing the control information (e.g., the request for call related operations, the records of call related operations, etc.) stored on the ledger. Furthermore, because the entries (or portions of the entries) of the ledger may be signed (e.g., digitally signed) and/or may be encrypted, this prevents unauthorized users from accessing or modifying the entries. Examples of phone call related operations may include, but are not limited to, establishing calls, releasing calls, call forwarding, call waiting, voice mail related operations (e.g., retrieving or listening to voicemail, deleting voice mails, changing greeting messages), messaging operations (e.g., sending SMS messages or receiving SMS messages), etc.

FIG. 1 is a block diagram that illustrates an example system architecture 100, in accordance with some embodiments of the present disclosure. The system architecture 100 includes a PSTN 103 and telecommunications devices 110. As discussed above, the PSTN 103 may provide infrastructure and services for telecommunication. For example, the PSTN 103 may provide infrastructure and services to allow the telecommunications devices 110 to communicate with each other (e.g., to establish phone calls, to send short message service (SMS) messages, to send text messages, etc.). The PSTN 103 includes a network 105, telecommunications operators 120, and a blockchain system 130. Each telecommunications operator 120 may provide telecommunications services to one or more of the telecommunications devices 110, as discussed above. For example, each telecommunications operator 120 may operate one or more networks to allow telecommunications devices 110 to make phone calls (e.g., telephone calls).

As illustrated in FIG. 1, the PSTN 103 includes a blockchain system 130. In one embodiment, the blockchain system 130 may be a system that uses a ledger 133 to record operations, transactions, events, etc., in the system architecture 100 (e.g., in the PSTN 103). For example, the ledger may include entries that indicate, store, or record one or more of: a phone call related operations that have been performed, phone call related operations that have been requested, phone call related operations that have been approved, phone call related operations that have been denied, instructions provided by telecommunications operators, other control information, etc. The ledger 133 includes a plurality of blocks which are linked together and are secured using cryptographic functions. For example, each block may include a hash of the previous block, a timestamp, and other data (e.g., a copy of the message, a result, etc.). The blockchain system 130 includes a set of nodes 131 (e.g., one or more nodes 131, a plurality of nodes 131, etc.) coupled to each other via a network 105. The nodes 131 may also be referred to as telecommunications nodes.

Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (Wi-Fi) hotspot connected with the network 105 and/or a wireless carrier system that can be implemented using various data processing equipment, communication towers (e.g. cell towers), etc. The network 105 may carry communications (e.g., data, message, packets, frames, etc.) between the nodes 131 and the telecommunications devices 110.

A node 131 (e.g., a telecommunications node) may be a combination of one or more computing devices. A computing device may be any suitable type of computing device or machine that has a programmable processor including, for example, server computers, desktop computers, laptop computers, tablet computers, smartphones, set-top boxes, etc. In some examples, a computing device may comprise a single machine or may include multiple interconnected machines (e.g., multiple servers configured in a cluster). A node 131 may also be one or more virtual environments. In one embodiment, a virtual environment 113 may be a virtual machine (VM) that may execute on a hypervisor which executes on top of the OS for a computing device. The hypervisor may manage system sources (including access to hardware devices, such as processors, memories, storage devices). The hypervisor may also emulate the hardware (or other physical resources) which may be used by the VMs to execute software/applications. In another embodiment, a virtual environment may be a container that may execute on a container engine which executes on top of the OS for a computing device, as discussed in more detail below. The container engine may allow different containers to share the OS of a computing device (e.g., the OS kernel, binaries, libraries, etc.). The blockchain system 130 may use the same type or different types of virtual environments. For example, all of the nodes 131 may be VMs. In another example, all of the nodes 131 may be containers. In a further example, some of the nodes 131 may be VMs, other nodes 131 may be containers, and other nodes may be computing devices (or groups of computing devices).

In one embodiment, the blockchain system 130 may be a permissioned blockchain. A permissioned blockchain may be a blockchain where the nodes 131 (e.g., telecommunications nodes) are authenticated or given permission to be included in the blockchain system 130. For example, the nodes 131 may have been previously verified or authenticated with an administrator or an administrative group that manages or oversees the blockchain system 130. This may indicate that the nodes 131 are trusted by the blockchain system 130 and thus security requirements or operations for accessing the ledger 133 that may generally be used in blockchain systems may be relaxed or reduced. For example, the computational task (e.g., a computational challenge) for creating new entries may be removed or the complexity of the computational task may be reduced. A permissioned blockchain may also indicate which nodes 131 have what type of access to the ledger 133. For example, some nodes 131 may have read and write access to the ledger 133 and other nodes 131 may have read access to the ledger 133. In addition, nodes 131 may have their permissions modified or revoked.

In some embodiments, the use of a computationally expensive task when creating entries in the ledger 133 may be reduced or relaxed when the blockchain system 130 is a permissioned blockchain. A general blockchain system may use a computationally expensive task (e.g., a task that uses a large amount of processing power or capability, such as computer large hashes, large numbers, etc.) to help maintain the authenticity or integrity of a ledger (e.g., a distributed ledger). Relaxing or reducing the computational task may allow the blockchain system 130 to create entries more quickly which may be useful because the nodes 131 may communicate large volumes or amounts of control information (e.g., requests to establish calls, requests to forward calls, requests to transmit SMS messages, etc.).

In one embodiment, the telecommunications operators 120 may be authenticated before the telecommunications operators 120 are allowed join the blockchain system 130 (e.g., before the telecommunications operators 120 are allowed access to the ledger 133). Each telecommunications operator 120 may be required to provide strong credentials that may be independently verified. For example, each node 131 of each telecommunications operator 120 (e.g., each telecommunications node) may use a digital certificate provided by a globally recognized certificate authorized in order to access the blockchain system 130.

As discussed above, the PSTN 103 may use signaling protocols to exchange control information related to various phone call related operations (e.g., setup, release, transfer, etc., of phone calls) within the PSTN 103. For example, the telecommunications operators 120 may transmit messages to each other to request phone call related operations, to indicate that a request for a phone call related operation has been approved or rejected, to indicate that phone call related operations have been performed, etc. The signaling protocols may indicate how messages should be transmitted between telecommunications operators 120, the contents of the messages, how phone call related operations, should be performed, etc.

In one embodiment, the ledger 133 (e.g., a distributed ledger) may be a record of the control information (e.g., control messages) between telecommunications operators 120 of the PSTN 103. For example, a request from a first telecommunications operator 120 (e.g., a control message or control information) to forward (e.g., transfer) phone calls (e.g., a phone call related operation) from a first telecommunications device 110 to a second telecommunications device 110, and the approval of that request may be stored as entries in the ledger. In another example, each time a phone call is forwarded or transferred from the first telecommunications device 110 to the second telecommunications device 110, the ledger 133 may be updated to indicate that the phone call was forwarded or transferred.

Each ledger 133 may be stored in a data store (not illustrated in the figures) of a respective node 131. A persistent storage may be one or more devices that are capable of storing data. A persistent storage may be a local storage unit or a remote storage unit. Persistent storage may be a magnetic storage unit, optical storage unit, solid state storage unit, electronic storage units (main memory, cache, random access memory (RAM)), or similar storage unit. Persistent storage may also be a monolithic/single device or a distributed set of devices.

In one embodiment, a node 131 may determine that a phone call related operation between a first telecommunications operator 120 and a second telecommunications operator 120 has been requested. For example, the first telecommunications operator 120 may receive a message (e.g., a packet, a frame, control information, etc.) indicating that a first telecommunications device 110 (which is served by the first telecommunications operator 120) wants to establish a phone call with a second telecommunications device 110 (which is served by the second telecommunications operator 120). The node 131 may determine that a phone call related operation has been requested in various ways. For example, the node 131 may receive a message from a telecommunications device 110 requesting the phone call related operation, as discussed above. In another example, the node 131 may determine that a phone call related operation should be requested based on other operations internal to the telecommunications operator 120. For example, if a user disables call waiting, the node 131 may update the ledger 133 to indicate that a telecommunications device 110 of the user is no longer performing call waiting.

In one embodiment, the node 131 may update the ledger 133 (e.g., a distributed ledger) to indicate that the phone call related operation between the first telecommunications operator 120 and the second telecommunications operator 120 has been requested. For example, the node 131 may add an entry (e.g., a block) into the ledger 133 indicating that the phone call related operation between the first telecommunications operator 120 and the second telecommunications operator 120 has been requested. Each entry may include data (e.g., text, alphanumeric strings, numbers, or other data) indicating one or more phone call related operations. The entries (e.g., blocks) of the ledger 133 are discussed in more detail below.

As discussed above, the blockchain system 130 may use asymmetric encryption to allow nodes 131 to read from and write to the ledger 133. Asymmetric encryption may also be referred to as public/private key encryption. Also as discussed above, the requested phone call related operation may be between a first telecommunications operator 120 and a second telecommunications operator 120. For example, the first telecommunications operator 120 may request the second telecommunications operator 120 to perform a phone call related operation. In one embodiment, when the request is from the first telecommunications operator 120 to the second telecommunications operator 120, the node 131 of the first telecommunications operator 120 may encrypt the entry in the ledger 133 with a public key of the second telecommunications operator 120. The second telecommunications operator 120 may receive the entry when the ledger 133 of the node 131 of the second telecommunications operator 120 is updated. The second telecommunications 120 may be able to decrypt the entry (added by the first telecommunications operator 120) using a private key of the second telecommunications operator 120. By using the public key of the second telecommunications operator 120 to encrypt the entry (or portion of the entry) in the ledger 133, the first telecommunications operator 120 and the second telecommunications operator 120 may be able to prevent unauthorized devices (e.g., other nodes 131 of other telecommunications operators 120) from accessing the entries. For example, this may prevent a hacker or other malicious user from reading the ledger 133 and determine what phone call related operation was requested.

In one embodiment, the second telecommunications operator 120 may review the request from the first telecommunications operator 120 to perform the phone call related operation. If the second telecommunications operator 120 approves the operation, the second telecommunications operator 120 may update the ledger 133 to indicate that the operation was approved. If the second telecommunications operator 120 does not approve the operation, the second telecommunications operator 120 may update the ledger 133 to indicate that the operation was not approved.

In one embodiment, the first telecommunications operator 120 may analyze the ledger 133 to determine if the phone call related operation was approved. For example, when the first telecommunications operator 120 requests an operation to be performed by or to be performed in conjunction with the second telecommunications 120, the first telecommunications operator 120 may analyze the ledger 133 to determine whether the second telecommunications operator 120 has added an entry indicating that the requested phone call related operation has been approved or denied (e.g., whether the second telecommunications operator 120 will allow the phone call related operation to proceed or will perform the phone call related operation). As discussed above, the entry added by the second telecommunications operator 120 (indicating whether the phone call related operation has been approved or denied) may be encrypted using a public key of the first telecommunications operator 120. The first telecommunications operator 120 may decrypt the entry (added by the second telecommunications operator 120) using a private key of the first telecommunications operator 120. By using the public key of the first telecommunications operator 120 to encrypt the entry (or portion of the entry) in the ledger 133, the first telecommunications operator 120 and the second telecommunications operator 120 may be able to prevent unauthorized devices (e.g., other nodes 131 of other telecommunications operators 120) from accessing the entries.

If the node 131 of the first telecommunications operator 120 determines that the entry indicates that the phone call related operation has been approved by the second telecommunications operator 120, the first telecommunications operator 120 may proceed with performing the phone call related operation. For example, the first telecommunications operator 120 may proceed with establishing a phone call between a first telecommunications device 110 of the first telecommunications operator 120 and a second telecommunications device 110 of the second telecommunications operator 120. In another example, the first telecommunications operator 120 may forward phone calls to the second telecommunications device 110 of the second telecommunications operator 120, to the first telecommunications device 110 of the first telecommunications operator 120. The node 131 of the first telecommunications operator 120 may also update the ledger 133 to indicate that the phone call related operation was performed. For example, the node 131 of the first telecommunications operator 120 may add an entry indicating that the phone call related operation was performed.

If the node 131 of the first telecommunications operator 120 determines that the entry indicates that the phone call related operation has not been approved by the second telecommunications operator 120, the first telecommunications operator 120 may refrain from performing the phone call related operation. For example, the first telecommunications operator 120 may not perform the phone call related operation.

In one embodiment, the node 131 of a telecommunications operator 120 may analyze the ledger 133 to determine whether one or more unauthorized phone call related operations have been performed, or whether one or more suspicious (e.g., possibly unauthorized) phone call related operations have been performed. As discussed above, entries may be added to the ledger 133 when a phone call related operation is performed. The node 131 may analyze the ledger 133 to determine whether any of the phone call related operations are associated with or involve the telecommunications operator 120. For example, if the ledger indicates that calls to a telecommunications device 110 of a first telecommunications operator 120 have been forwarded to a different telecommunications of a different telecommunications operator 120, the first telecommunications operator 120 may analyze the entry to determine whether that forwarding of the calls was authorized (e.g., was authorized or approved by the first telecommunications operator 120).

In another embodiment, the node 131 of a telecommunications operator 120 may analyze the ledger 133 to determine whether one or more unauthorized phone call related operations have been requested, or whether one or more suspicious (e.g., possibly unauthorized) phone call related operations have been requested. For example, a first telecommunications operator 120 may analyze the entries of the ledger 133 and may determine that a second telecommunications operator 120 has repeatedly requested to establish a phone call with a telecommunications device 110, or has repeatedly requested to transfer phone calls to a telecommunications device 110.

The node 131 of the telecommunications operator 120 may use various parameters, criteria, factors, etc., when determining whether a phone call related operation that was performed or requested, is suspicious. For example, the node 131 may determine the geographical locations of the telecommunications devices 110 that are involved or associated with the phone call related operation. If a telecommunications operator 120 is trying to transfer calls placed to a telecommunications device 110 that is located in France, to a telecommunications device 110 that is located in Argentina, the node 131 may determine that the requested phone call related operation (e.g., the transfer of the calls) is suspicious. In another example, the node 131 may also determine whether a phone call related operation that was performed or requested, is suspicious based on the number of occurrences over a period of time. For example, if the node 131 of a first telecommunications operator 120 determines that more than a threshold number of requests (e.g., more than five, ten or some other appropriate number of requests) to establish a phone call with a telecommunications device 110 have been received from a second telecommunications operator 120 within a threshold period of time (e.g., within the last minute, the last thirty minutes, or some other appropriate period of time), the node 131 may determine that the requests from the second telecommunications operator 120 are suspicious.

In one embodiment, if a node 131 of a first telecommunications operator 120 determines that an unauthorized operation has been performed by a second telecommunications operator 120 or a suspicious operation has been requested by the second telecommunications operator 120, the node 131 may perform one or more security procedures. For example, the node 131 may update the distributed ledger with an entry to indicate that the second telecommunications operator 120 should not be allowed to perform a certain type of phone call related operation (e.g., should not be allowed to perform forwarding operations, should not be allowed to establish calls to a telecommunications device 110, should not be allowed to leave voicemails, etc.). Other telecommunications operators 120 may be able to read the entry and may also prevent the second telecommunications operator 120 from performing the type of hone call related operation. In another example, the node 131 may add an entry to the ledger 133 (e.g., update the ledger 133) indicating that the second telecommunications operator 120 has performed unauthorized operations or has requested suspicious operations. This may allow the other telecommunications operators 120 to also analyze the ledger 133 to determine if the second telecommunications operator 120 has performed unauthorized operations or has requested suspicious operations.

In one embodiment, the node 131 of the first telecommunications operator 120 may initiate a voting procedure to prevent the second telecommunications operator 120 from accessing the ledger 133 for a period of time, if the node 131 determines that an unauthorized operation has been performed by a second telecommunications operator 120 or a suspicious operation has been requested by the second telecommunications operator 120. For example, the first telecommunications operator 120 may add an entry to the ledger 133, indicating that the first telecommunications operator 120 would like the other telecommunications operators 120 to provide a vote as to whether the second telecommunications operator 120 should be denied access to the ledger 133. The other telecommunications operators 120 may analyze the ledger 133 and if the other telecommunications operators 120 determine that the unauthorized operations have occurred suspicious operations have been requested, the other telecommunications operators may vote to deny the second telecommunications operator 120 access to the ledger 133. The blockchain system 130 may use different threshold numbers of votes to determine whether the second telecommunications operator 120 should have access to the ledger 133. For example, the blockchain system 130 may use a simple majority to determine whether the second telecommunications operator 120 should have access to the ledger 133. In another example, the blockchain system 130 may use a two-thirds majority or any other appropriate voting system to determine whether the second telecommunications operator 120 should have access to the ledger 133.

In one embodiment, the blockchain system 130 may use SS7 protocol. For example, the flow of messages, the types of messages, the contents of the messages, etc., that are added to the ledger 133 may follow or conform to the SS7 protocol. This may allow the blockchain system 130 to leverage of the existing SS7 protocol for control information in the PSTN 103.

As discussed above, a traditional PSTN that uses a SS7 network may have various security issues. For example, access to the SS7 network may not be secure and the devices that access the SS7 network may not be authenticated. In another example, the messages that are transmitted via the SS7 network may not be encrypted, which allows other devices to read or modify the messages. In a further example, the SS7 network may not maintain a list of record of the messages or operations that have been performed. This may make it difficult to track malicious users who may try to gain unauthorized access to the SS7 network and may attempt to read or modify messages.

In one embodiment, the system architecture 100 uses a blockchain system 130 and a ledger 133 (E.g., a distributed ledger) to record requests for phone call related operations, to record when phone call related operations are performed, and to record various other control information, data, signaling, etc., related to phone calls (e.g., telephone calls). Because the ledger 133 is distributed across multiple nodes 131, it may be protected against loss. In addition, because blockchain system 130 may be a permissioned blockchain system, it helps prevent unauthorized users from accessing the blockchain. Furthermore, because the entries (or portions of the entries) of the ledger 133 are encrypted, this prevents unauthorized users from accessing (e.g., reading) the entries. The consensus mechanisms of the blockchain system 130 also prevent the ledger 133 from being modified by a malicious user because the malicious user would have great difficulty in compromising a majority of the nodes 131 in order to modify the ledger 133. Lastly, the ledger 133 provides a list, record, etc., of the various phone call related operations that have been performed within the PSTN 103. This allows for better record keeping and allows the telecommunications operators 120 to analyze the ledger 133 at a later point in time to determine if unauthorized operations have occurred or have been requested.

Figure 2:
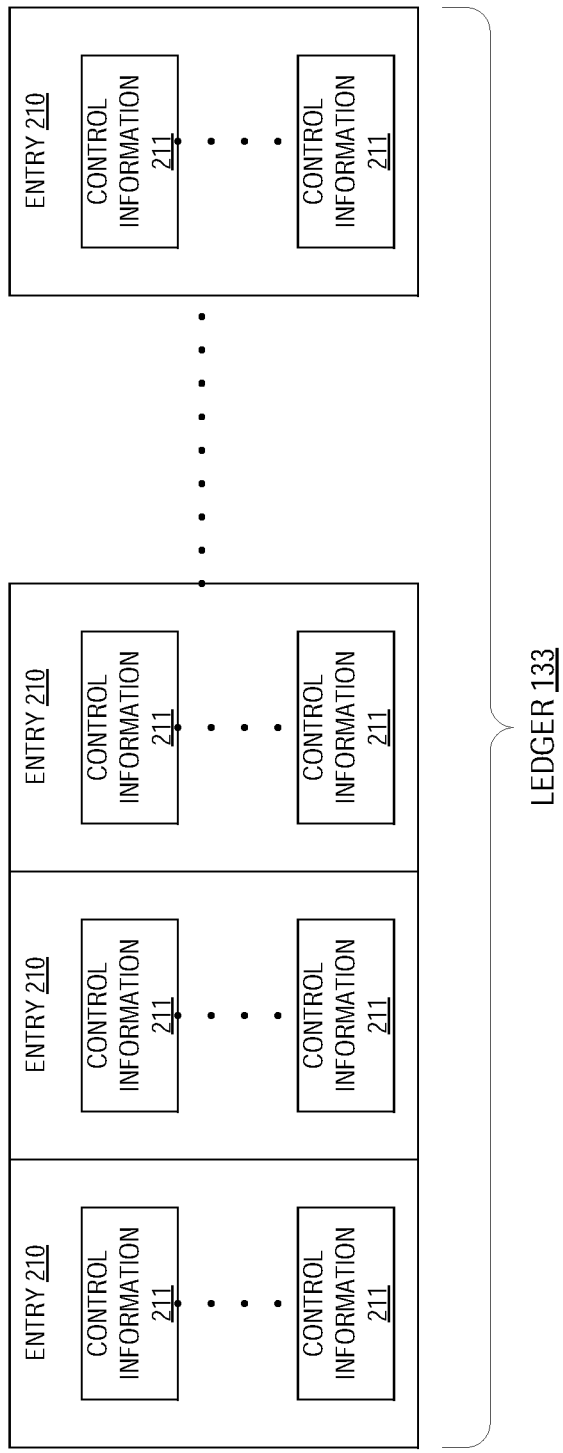
FIG. 2 is a block diagram that illustrates an example ledger, in accordance with some embodiments of the present disclosure.

FIG. 2 is a block diagram that illustrates an example ledger 133, in accordance with some embodiments of the present disclosure. The ledger 133 may also be referred to as a distributed ledger. Copies of the ledger 133 may be stored on nodes of a blockchain system. For example, each node 131 of a blockchain system 130 (illustrated in FIG. 1) may store a copy of the ledger 133, as discussed above. As discussed above, various telecommunications operators may use the ledger 133 to exchange control information, such as requests to perform a call related operation, a record that a call related operation was approved, denied, or performed, etc. The control information 211 may be stored in the entries 210 of the ledger 133. Different numbers of control information 211 may be part of the entries 210 in different embodiments (e.g., each entry 210 may include one or more control information 211).

Each control information 211 may include various pieces of information or data. For example, the control information 211 may include an identifier (e.g., a number, a code, a string, text, etc.) for the call related operation that was requested, approved, denied, or performed. In another example, the control information 211 may include an identifier (e.g., a number, a code, a string, text, etc.) for the telecommunications operator that requested or performed a call related operation. In a further example, the control information 211 may include an identifier for the telecommunications that may be the intended recipient of the control information 211. For example, if the control information is a request to another telecommunications operator, the control information 211 may include an identifier for the other telecommunications operator. In yet another example, the control information 211 may include an identifier (e.g., a number, a code, a string, text, etc.) for telecommunications operators that may be involved in a requested call related operation. For example, if the control information 211 includes or indicates a request to forward calls from a first telecommunications operator to a second telecommunications operator, the control information may include identifiers for both the first and second telecommunications operators.

The control information 211 may also include a request to initiate a voting procedure and the results of the vote. When the control information 211 includes a request to initiate a voting procedure, the control information 211 may include an identifier of the telecommunications operator that initiated the voting procedure and the telecommunications operator that is the target of the voting procedure. If the control information 211 includes the result of a vote, the control information 211 may include an identifier of the telecommunications operator that provided the vote.

Figure 3:
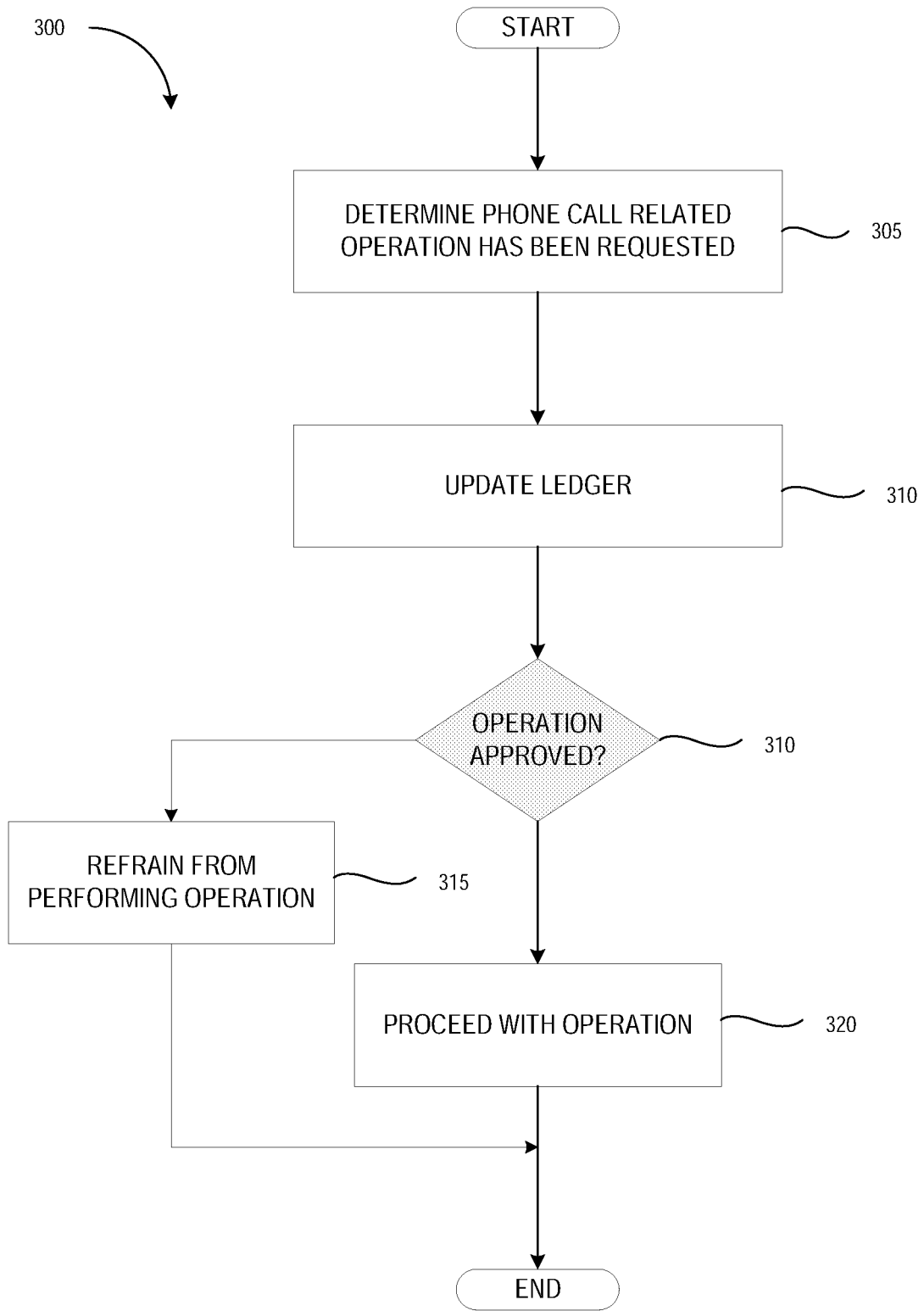
FIG. 3 is a flow diagram of a method of performing a call related operation, in accordance with some embodiments of the present disclosure.

FIG. 3 is a flow diagram of a method 300 of performing a call related operation, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a node (e.g., node 131 illustrated in FIG. 1), a telecommunications operator, and/or one or more computing devices.

The method 300 begins at block 305, where the method 300 determines that a call related operation has been requested. For example, the method 300 may determine whether a request was received from a telecommunications device to request the call related operation. At block 310, the method 300 may update the ledger to indicate that the request was received. For example, the method 300 may an entry to a distribute ledger to indicate that the request was received. At block 310, the method 300 may determine whether the operation was approved. For example, the method 300 may determine whether a second entry has been added to the ledger, indicating that the operation was approved. If the operation was not approved, the method 300 may refrain from performing the operation at block 315. If the operation was approved, the method 300 may proceed with the operation (e.g., may perform the operation) at block 320. The method 300 may also update the ledger with another entry to indicate that the operation was performed.

Figure 4:
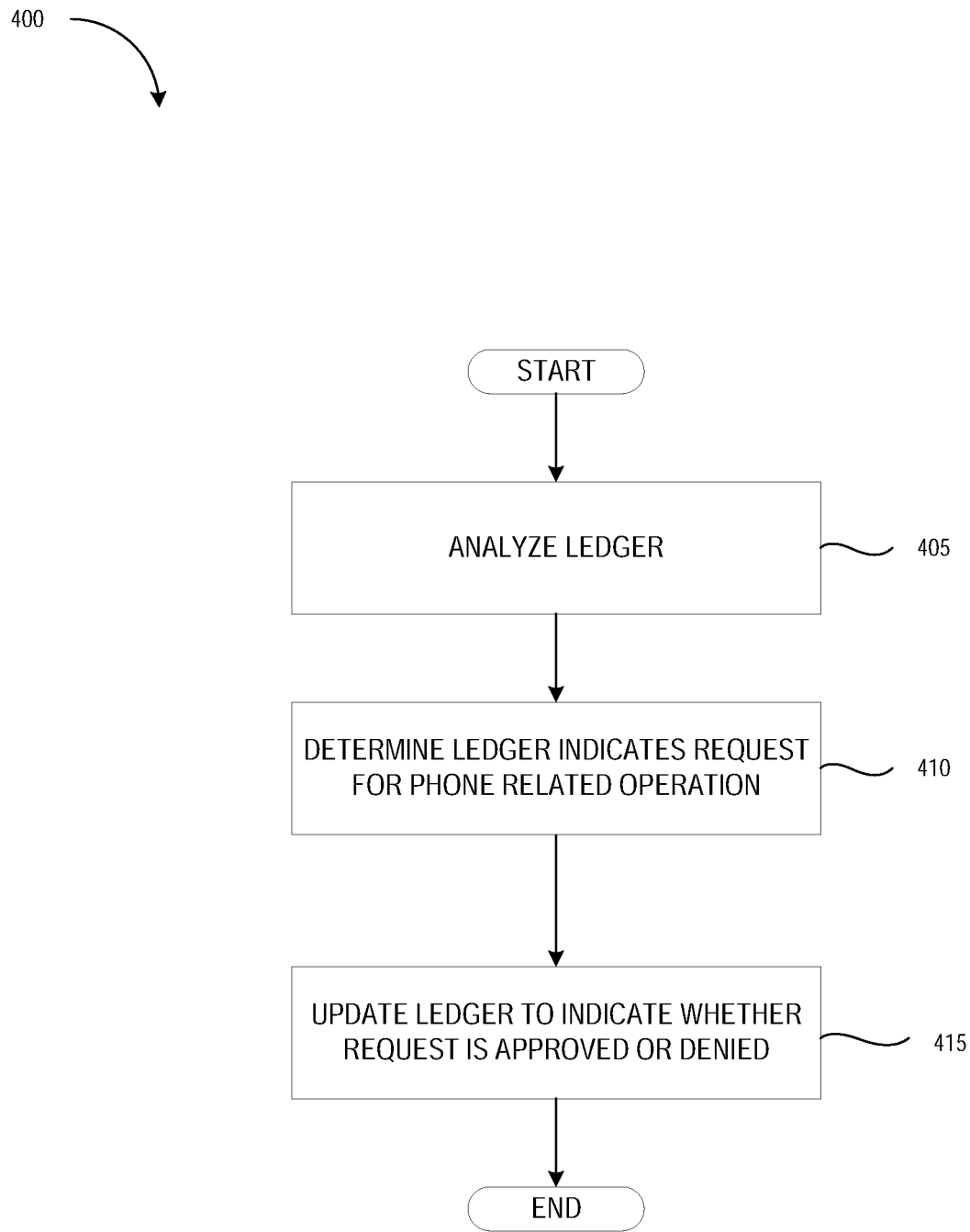
FIG. 4 is a flow diagram of a method of performing a call related operation, in accordance with some embodiments of the present disclosure.

FIG. 4 is a flow diagram of a method 400 of performing a call related operation, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a node (e.g., node 131 illustrated in FIG. 1, which may be a telecommunications node), a telecommunications operator, and/or one or more computing devices.

The method 400 begins at block 405, where the method 400 analyzes the ledger. For example, the method 400 may analyze entries in the ledger. At block 410, the method 400 may determine that the ledger indicates a request for a phone related operation. For example, the ledger may include an entry that includes a request from a telecommunications operator to perform a call related operation (e.g., includes control information). The method 400 may also determine whether to approve or deny the request. For example, a telecommunications operator may determine whether to allow calls to a telecommunications device in the telecommunications operator's network, to be forwarded to a different telecommunications device. The method 400 may update the ledger to indicate whether the request for the call related operation is approved or denied at block 415. For example, the method 400 may add an entry in the ledger indicating whether the call related operation was approved or denied.

Figure 5:
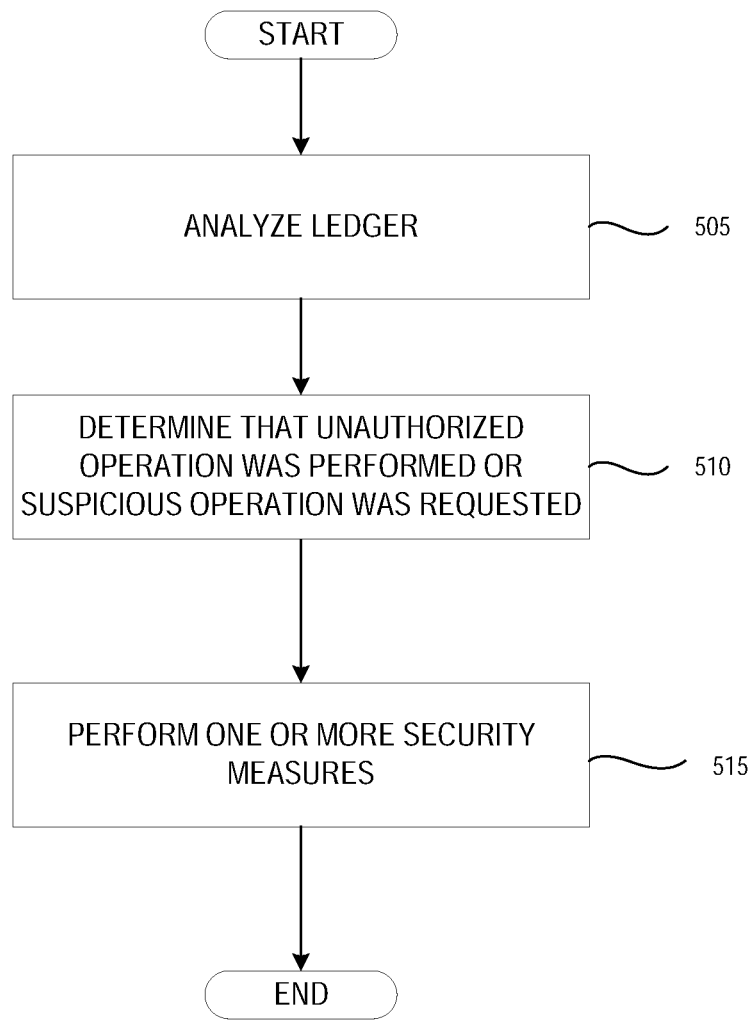
FIG. 5 is a flow diagram of a method of performing a security procedure, in accordance with some embodiments of the present disclosure.

FIG. 5 is a flow diagram of a method 500 of performing a security procedure, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a node (e.g., node 131 illustrated in FIG. 1, which may be a telecommunications node), a telecommunications operator, and/or one or more computing devices.

The method 500 begins at block 505, where the method 500 analyzes the ledger. For example, the method 500 may analyze entries in the ledger. The method 500 may determine that an unauthorized operation occurred or that a suspicious operation was requested based on the ledger at block 510. For example, the method 500 may analyze an entry in the ledger indicating that a call related operation (e.g., call forwarding) was performed. The method 500 may determine that the call should not have been forwarded. In another example, the method 500 may determine that a telecommunications operator has requested too many call forwards during a period of time. At block 515, the method 500 may perform one or more security measures. For example, the method 500 may update the ledger with an entry indicating that a telecommunications operator should not be allowed to perform a type of operation. In another example, the method 500 may initiate a voting procedure.

Figure 6:
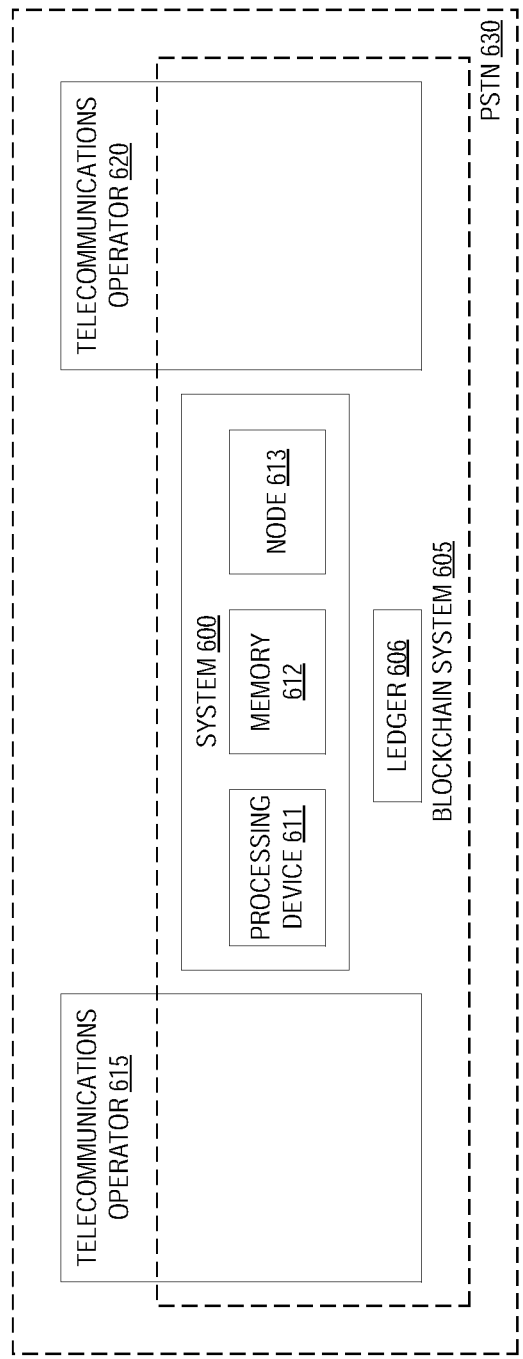
FIG. 6 is a block diagram of an example apparatus that may perform one or more of the operations described herein, in accordance with some embodiments of the present disclosure.

FIG. 6 is a block diagram of an example apparatus 600 that may perform one or more of the operations described herein, in accordance with some embodiments. The apparatus 600 may include a node 613 of a block chain system 605. The apparatus 600 includes a memory 612 and a processing device 611 operatively coupled to the memory 612. The processing device 611 may determine that a phone call related operation between a first telecommunications operator 615 and a second telecommunications operator 620 has been requested. A public switched telephone network (PSTN) 630 includes the first telecommunications operator 615 and the second telecommunications operator 620. The processing device 611 may also update a ledger 606 to indicate that the phone call related operation between the first telecommunications operator 615 and the second telecommunications operator 620 has been requested. The processing device 611 may also analyze the distributed ledger 606 to determine if the phone call related operation has been approved. The processing device 611 may proceed with the phone call related operation in response to determining that the phone call related operation has been approved.

Figure 7:
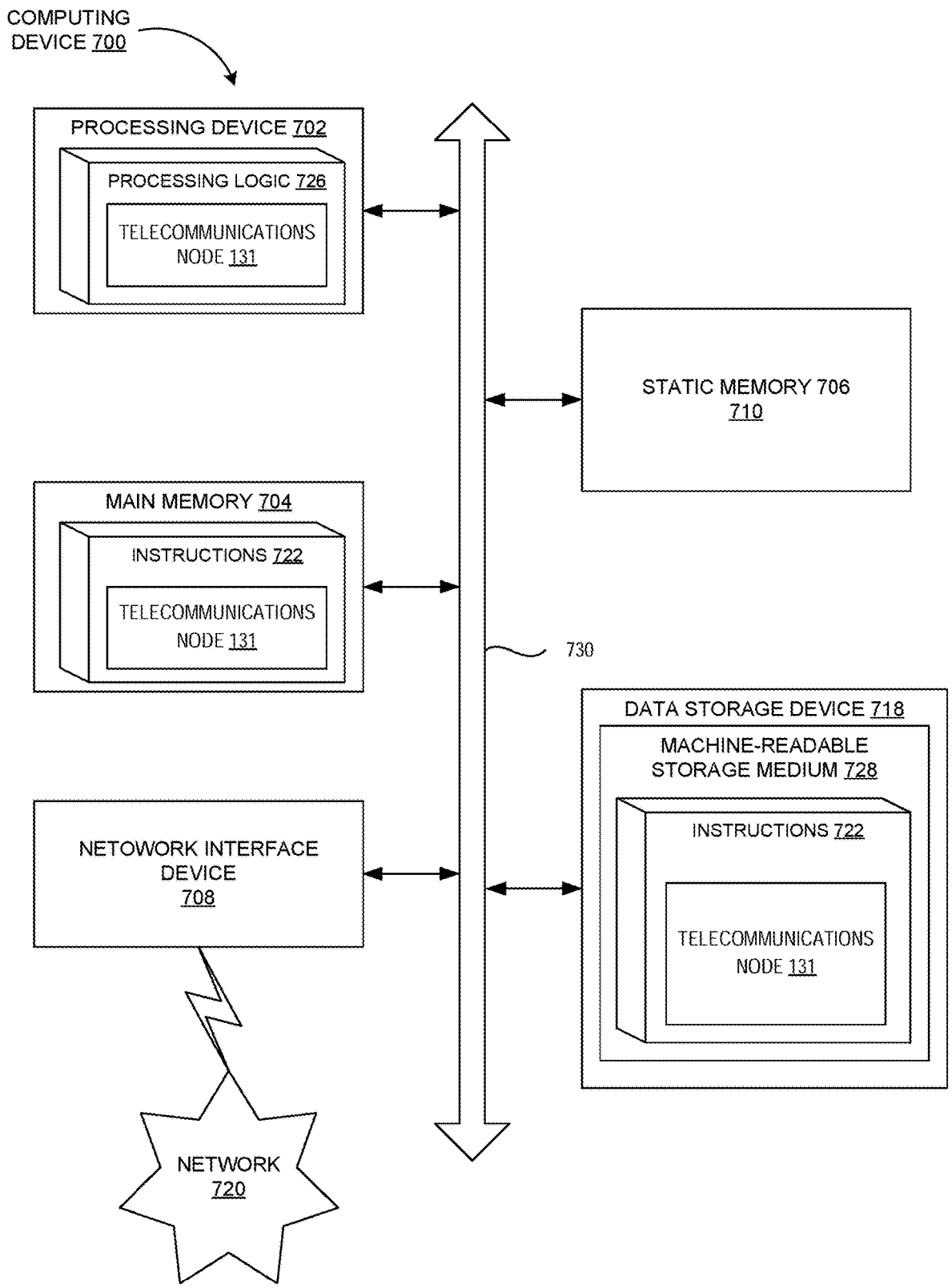
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of node, such as node 131 (e.g., a telecommunications node) illustrated in FIG. 1.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of telecommunications node 131 of FIG. 1, for performing the operations and steps discussed herein.

The data storage device 718 may include a non-transitory machine-readable storage medium 728, on which is stored one or more set of instructions 722 (e.g., software) embodying any one or more of the methodologies of functions described herein, including instructions to cause the processing device 702 to execute node 131. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The non-transitory machine-readable storage medium 728 may also be used to store instructions to perform a method for multi-level task debugging, as described herein. While the non-transitory machine-readable storage medium 728 is shown in an exemplary embodiment to be a single medium, the term "non-transitory machine-readable storage medium" should be taken to include a single medium or multiple media (e.g., a centralized or distributed database, or associated caches and servers) that store the one or more sets of instructions. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the non-transitory machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method, comprising:
   determining that a phone call related operation between a first telecommunications operator and a second telecommunications operator was requested, wherein a public switched telephone network (PSTN) comprises the first telecommunications operator and the second telecommunications operator;
   updating, by a node of a blockchain system, a distributed ledger to indicate that the phone call related operation between the first telecommunications operator and the second telecommunications operator was requested;
   analyzing the distributed ledger to determine if the phone call related operation was approved; and
   executing the phone call related operation in response to determining that the phone call related operation was approved.

2. The method of claim 1, wherein determining that the phone call related operation was requested comprises:
   receiving a request from a first user of the first telecommunications operator to perform the phone call related operation.

3. The method of claim 1, wherein updating the distributed ledger to indicate that the phone call related operation was requested comprises:
   adding an entry in the distributed ledger, wherein the entry indicates that the phone call related operation was requested.

4. The method of claim 3, wherein:
the entry is encrypted using a public key of the second telecommunications operator; and
the entry is decrypted by the second telecommunications operator using a private key of the second telecommunications operator.

5. The method of claim 1, wherein analyzing the distributed ledger to determine if the phone call related operation was approved comprises:
determining whether the distributed ledger comprises an entry from the second telecommunications operator, wherein the entry indicates that the phone call related operation was approved.

6. The method of claim 5, wherein:
the entry is encrypted using a public key of the first telecommunications operator; and
the entry is decrypted by the first telecommunications operator using a private key of the first telecommunications operator.

7. The method of claim 1, further comprising:
analyzing the distributed ledger to determine whether an unauthorized operation was performed by a third telecommunications operator; and
performing one or more security procedures in response to determining that the unauthorized operation as performed by the third telecommunications operator.

8. The method of claim 7, wherein performing the one or more security procedures comprises:
updating the distributed ledger to indicate that the third telecommunications operator should no longer be allowed to perform a type of operation.

9. The method of claim 7, wherein performing the one or more security procedures comprises:
initiating a voting procedure to prevent the third telecommunications operator from accessing the blockchain system for a period of time.

10. The method of claim 1, wherein the blockchain system comprises a permissioned blockchain system.

11. The method of claim 1, wherein:
the first telecommunications operator comprises the node of the blockchain system; and
the second telecommunications operator comprises a second node of the blockchain system.

12. A system, comprising:
a memory; and
a processing device, operatively coupled to the memory, to:
determine that a phone call related operation between a first telecommunications operator and a second telecommunications operator was requested, wherein a public switched telephone network (PSTN) comprises the first telecommunications operator and the second telecommunications operator;
update, by a node of a blockchain system, a distributed ledger to indicate that the phone call related operation between the first telecommunications operator and the second telecommunications operator was requested;
analyze the distributed ledger to determine if the phone call related operation was approved; and
proceed with the phone call related operation in response to determining that the phone call related operation was approved.

13. The system of claim 12, wherein to determine that the phone call related operation was requested, the processing device is further configured to:
receive a request from a first user of the first telecommunications operator to perform the phone call related operation.

14. The system of claim 12, wherein to update the distributed ledger to indicate that the phone call related operation was requested, the processing device is further configured to:
add an entry in the distributed ledger, wherein the entry indicates that the phone call related operation was requested.

15. The system of claim 14, wherein:
the entry is encrypted using a public key of the second telecommunications operator; and
the entry is decrypted by the second telecommunications operator using a private key of the second telecommunications operator.

16. The system of claim 12, wherein to analyze the distributed ledger to determine if the phone call related operation was approved the processing device is further configured to:
determine whether the distributed ledger comprises an entry from the second telecommunications operator, wherein the entry indicates that the phone call related operation was approved.

17. The system of claim 16, wherein:
the entry is encrypted using a public key of the first telecommunications operator; and
the entry is decrypted by the first telecommunications operator using a private key of the first telecommunications operator.

18. The system of claim 12, wherein the processing device is further configured to:
analyze the distributed ledger to determine whether an unauthorized operation was performed by a third telecommunications operator; and
perform one or more security procedures in response to determining that the unauthorized operation as performed by the third telecommunications operator.

19. The system of claim 18, wherein to perform the one or more security procedures, the processing device is further configured to:
update the distributed ledger to indicate that the third telecommunications operator should not be allowed to perform a type of operation.

20. A non-transitory computer-readable storage medium including instructions that, when executed by a processing device, cause the processing device to perform operations comprising:
determining that a phone call related operation between a first telecommunications operator and a second telecommunications operator was requested, wherein a public switched telephone network (PSTN) comprises the first telecommunications operator and the second telecommunications operator;
updating, by a node of a blockchain system, a distributed ledger to indicate that the phone call related operation between the first telecommunications operator and the second telecommunications operator was requested;
analyzing the distributed ledger to determine if the phone call related operation was approved; and
executing the phone call related operation in response to determining that the phone call related operation was approved.

* * * * *